United States Patent
Shen et al.

(10) Patent No.: US 12,028,818 B2
(45) Date of Patent: Jul. 2, 2024

(54) MEASUREMENT PROCESSING METHOD, PARAMETER CONFIGURATION METHOD, TERMINAL, AND NETWORK DEVICE

(71) Applicant: VIVO MOBILE COMMUNICATION CO., LTD., Guangdong (CN)

(72) Inventors: Xiaodong Shen, Guangdong (CN); Kai Wu, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 397 days.

(21) Appl. No.: 17/402,924

(22) Filed: Aug. 16, 2021

(65) Prior Publication Data

US 2021/0377890 A1 Dec. 2, 2021

Related U.S. Application Data

(63) Continuation of application No. PCT/CN2020/075292, filed on Feb. 14, 2020.

(30) Foreign Application Priority Data

Feb. 15, 2019 (CN) .......................... 201910118202.9

(51) Int. Cl.
*H04W 56/00* (2009.01)
*H04W 24/10* (2009.01)
(Continued)

(52) U.S. Cl.
CPC ......... *H04W 56/001* (2013.01); *H04W 24/10* (2013.01); *H04W 72/0446* (2013.01); *H04W 72/0453* (2013.01); *H04W 72/23* (2023.01)

(58) Field of Classification Search
None
See application file for complete search history.

(56) References Cited

U.S. PATENT DOCUMENTS

| | | |
|---|---|---|
| 2019/0014493 A1 | 1/2019 | Kim et al. |
| 2020/0229244 A1 | 7/2020 | Yan et al. |

(Continued)

FOREIGN PATENT DOCUMENTS

| | | |
|---|---|---|
| CN | 109246831 A | 1/2019 |
| CN | 110167134 A | 8/2019 |

OTHER PUBLICATIONS

Vivo, "Discussion on enhancements to initial access procedure", 3GPP TSG RAN WG1 Ad-Hoc Meeting 1901, R1-1900111, Taipei, Jan. 21-25, 2019.

(Continued)

*Primary Examiner* — Jason E Mattis
*Assistant Examiner* — Bao G Nguyen
(74) *Attorney, Agent, or Firm* — Price Heneveld LLP (57) ABSTRACT

Embodiments of this disclosure provide a method for processing a measurement, a parameter configuration method, a terminal, and a network device. The method includes: receiving a QCL configuration parameter for measuring a neighboring cell, where the neighboring cell is a cell adjacent to a serving cell of the terminal; and obtaining a measurement result of the neighboring cell based on a measurement result of a first SSB and a measurement result of a second SSB, where the first SSB and the second SSB satisfy a QCL relationship corresponding to the QCL configuration parameter.

20 Claims, 4 Drawing Sheets

(51) Int. Cl.
*H04W 72/0446* (2023.01)
*H04W 72/0453* (2023.01)
*H04W 72/23* (2023.01)

(56) References Cited

U.S. PATENT DOCUMENTS

2020/0245157 A1* 7/2020 Chande ................. H04W 74/08
2021/0282079 A1* 9/2021 Wu ......................... H04L 5/005
2021/0345201 A1* 11/2021 Cheng ............... H04W 36/0085
2021/0345275 A1* 11/2021 Kong ................ H04W 56/0015

OTHER PUBLICATIONS

Samsung, "Initial Access and Mobility Procedure for NR-U", 3GPP TSG RAN WG1 Meeting #95, R1-1812978, Spokane, USA, Nov. 12-16, 2018.
Nokia, "On DL Signals and Channels for NR-U Discussion and Decision", 3GPP TSG RAN WG1 Meeting #95, R1-1812696, Spokane, USA, Nov. 1-15, 2018.
Ericsson, "Enhancements to initial access procedure", 3GPP TSG-RAN WG1 Meeting AH#1901, R1-1900999, Taipei, Taiwan, Jan. 21-25, 2019.
Intel Corporation, "Remaining Details of SS Blocks", 3GPP TSG RAN WG1 Meeting #90bis, R1-1717353, Prague, Czech Republic, Oct. 9-13, 2017.

* cited by examiner

MEASUREMENT PROCESSING METHOD, PARAMETER CONFIGURATION METHOD, TERMINAL, AND NETWORK DEVICE

CROSS-REFERENCE TO RELATED APPLICATIONS

This application is a continuation application of International Application No. PCT/CN2020/075292 filed on Feb. 14, 2020, which claims priority to Chinese Patent Application No. 201910118202.9, filed in China on Feb. 15, 2019, both disclosures of which are incorporated herein by reference in their entireties.

TECHNICAL FIELD

This disclosure relates to the field of communications technologies, and in particular, to a method for processing a measurement, a parameter configuration control method, a terminal, and a network device.

BACKGROUND

In new radio (NR) systems, when a terminal performs synchronization signal reference signal received power (SS-RSRP) measurement, the terminal assumes that all synchronization signal blocks (SSB) having a same index have a quasi-co-location (QCL) relationship. In this way, when performing SS-RSRP measurement, the terminal uses measurement values of SSBs having a same index but in different periods as samples of a same measurement for RSRP processing (for example, power combining and averaging), to obtain a cell measurement result. However, in practical applications, there may be a case in which an SSB cannot be transmitted. For example, SSB #1 is transmitted in a first period, but fails to be transmitted in a second period. Because the terminal cannot detect SSB #1, accuracy of the measurement result is relatively poor.

SUMMARY

According to a first aspect, an embodiment of this disclosure provides a method for processing a measurement, applied to a terminal and including:
  receiving a QCL configuration parameter for measuring a neighboring cell, where the neighboring cell is a cell adjacent to a serving cell of the terminal; and
  obtaining a measurement result of the neighboring cell based on a measurement result of a first SSB and a measurement result of a second SSB, where the first SSB and the second SSB satisfy a QCL relationship corresponding to the QCL configuration parameter.

According to a second aspect, an embodiment of this disclosure provides a parameter configuration method, applied to a network device and including:
  transmitting a QCL configuration parameter for measuring a neighboring cell to a terminal, where the neighboring cell is a cell adjacent to a serving cell of the terminal.

According to a third aspect, an embodiment of this disclosure provides a terminal, including:
  a receiving module, configured to receive a QCL configuration parameter for measuring a neighboring cell, where the neighboring cell is a cell adjacent to a serving cell of the terminal; and
  a processing module, configured to obtain a measurement result of the neighboring cell based on a measurement result of a first SSB and a measurement result of a second SSB, where the first SSB and the second SSB satisfy a QCL relationship corresponding to the QCL configuration parameter.

According to a fourth aspect, an embodiment of this disclosure provides a network device, including:
  a transmitting module, configured to transmit a quasi-co-location QCL configuration parameter for measuring a neighboring cell to a terminal, where the neighboring cell is a cell adjacent to a serving cell of the terminal.

According to a fifth aspect, an embodiment of this disclosure provides a terminal, including a memory, a processor, and a program stored in the memory and capable of running on the processor, where when the program is executed by the processor, the steps of the method for processing a measurement provided in the embodiments of this disclosure are implemented.

According to a sixth aspect, an embodiment of this disclosure provides a network device, including a memory, a processor, and a program stored in the memory and capable of running on the processor, where when the program is executed by the processor, the steps of the parameter configuration method provided in the embodiments of this disclosure are implemented.

According to a seventh aspect, an embodiment of this disclosure provides a computer-readable storage medium, where the computer-readable storage medium stores a computer program, and when the computer program is executed by a processor, the steps of the method for processing a measurement provided in the embodiments of this disclosure are implemented, or when the computer program is executed by a processor, the steps of the parameter configuration method provided in the embodiments of this disclosure are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Terms "include", "comprise" and any other variants thereof in the specification and claims of the application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. In addition, in the specification and claims, the use of "and/or" represents presence of at least one of the connected objects, for example, "A and/or B" indicates that the following three cases: only A, only B, or both A and B.

In the embodiments of this disclosure, the terms such as "an example" or "for example" are used to represent an example, an illustration, or a description. Any embodiment or design solution described as "an example" or "for example" in the embodiments of this disclosure should not be construed as being more preferred or advantageous than other embodiments or design solutions. To be precise, the terms such as "example" or "for example" are intended to present a related concept in a specific manner.

The following describes embodiments of this disclosure with reference to the accompanying drawings. A method for processing a measurement, a parameter configuration method, a terminal, and a network device that are provided in the embodiments of this disclosure may be applied in a wireless communications system. The wireless communications system may be a 5G system, an evolved long term evolution (eLTE) system, a long term evolution (LTE) system, a later evolved communications system, or the like.

Figure 1:
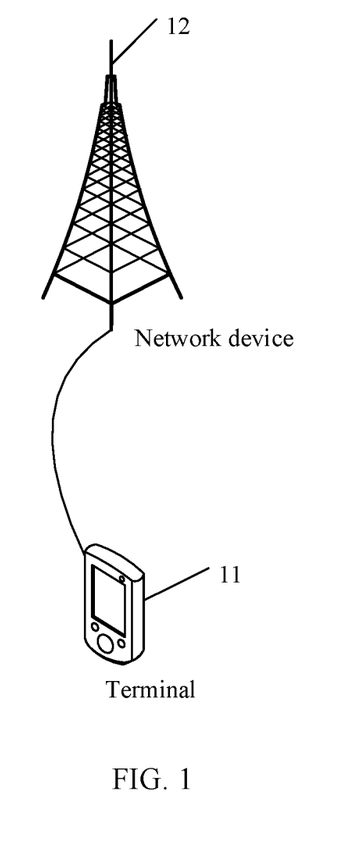
FIG. 1 is a structural diagram of a network system to which an embodiment of this disclosure may be applied.

FIG. 1 is a structural diagram of a network system to which an embodiment of this disclosure may be applied. As shown in FIG. 1, the network system includes a terminal 11 and a network device 12. The terminal 11 may be user equipment (UE) or another terminal-side device, for example a mobile phone, a tablet personal computer, a laptop computer, a personal digital assistant (PDA), a mobile Internet device (MID), a wearable device, or a robot. It should be noted that the terminal 11 is not limited to any specific type in the embodiments of this disclosure. The network device 12 may be a 4G base station, a 5G base station, a base station of a later version, or a base station in other communications systems, or may be referred to as a NodeB, an evolved NodeB, a transmission reception point (TRP), an access point (AP), or other terms in the field. As long as a same technical effect is achieved, the network device is not limited to a specific technical term. In addition, the network device 12 may be a master node (MN) or a secondary node (SN). It should be noted that, in the embodiments of this disclosure, the 5G base station is used as only an example, but the network device is not limited to any specific type.

Figure 2:
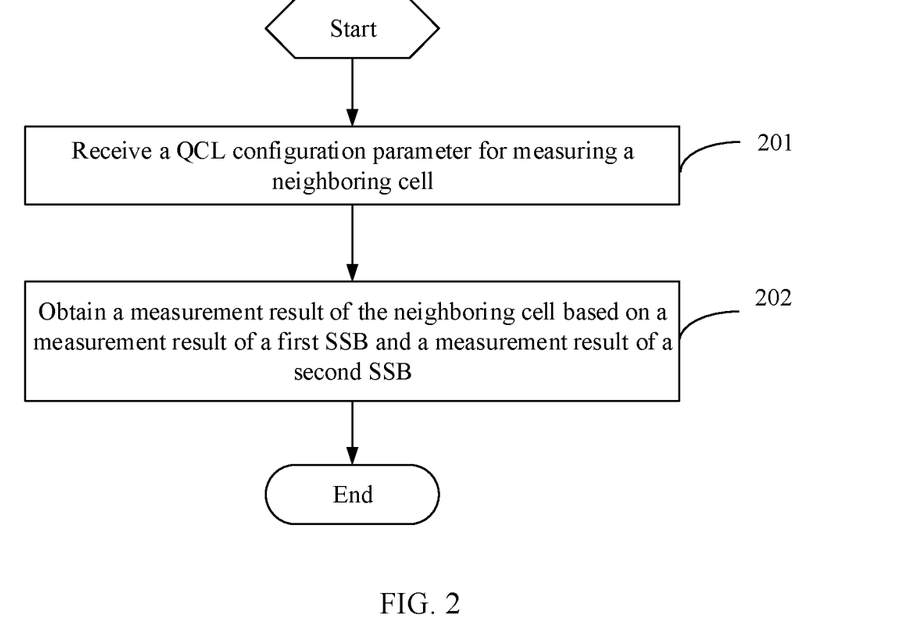
FIG. 2 is a flowchart of a method for processing a measurement according to an embodiment of this disclosure.

FIG. 2 is a flowchart of a method for processing a measurement according to an embodiment of this disclosure. The method is applied to a terminal, and includes the following steps, as shown in FIG. 2.

Step 201. Receive a QCL configuration parameter for measuring a neighboring cell, where the neighboring cell is a cell adjacent to a serving cell of the terminal.

The step 201 may refer to receiving a QCL configuration parameter transmitted by a network device and used for measuring the neighboring cell, for example, receiving a QCL configuration parameter transmitted by the network device in the serving cell and used for measuring the neighboring cell. Certainly, in this embodiment of this disclosure, another network device may transmit the QCL configuration parameter to the terminal, for example, a network device in the neighboring cell transmits the QCL configuration parameter to the terminal. To be specific, the network device configures the QCL configuration parameter when performing neighboring cell measurement configuration for the terminal.

In addition, the QCL configuration parameter may be QCL related information for indicating a QCL relationship, and based on the QCL configuration parameter, the terminal may determine multiple SSBs satisfying the QCL relationship.

Step 202. Obtain a measurement result of the neighboring cell based on a measurement result of a first SSB and a measurement result of a second SSB, where the first SSB and the second SSB satisfy a QCL relationship corresponding to the QCL configuration parameter.

The first SSB may be one or more SSBs, and the second SSB may be one or more SSBs, that is, the first SSB and the second SSB may represent multiple SSBs satisfying the QCL relationship corresponding to the QCL configuration parameter. For example, two or three SSBs satisfy the QCL relationship. Further, the first SSB and the second SSB may be SSBs in the neighboring cell, and the first SSB and the second SSB may be SSBs transmitted in different time locations in the neighboring cell. Furthermore, the first SSB and the second SSB may be SSBs transmitted by using a same beam or different beams, and the first SSB and the second SSB may be SSBs in a same period or different periods.

In addition, the first SSB and the second SSB may be SSBs detected within a measurement window corresponding to SSB measurement timing configurations (SMTC). Further, the SMTC and the QCL configuration parameter may be configured by the network device for the terminal through a same message. In this way, the terminal may perform measurement based on the SMTC configured by the network device, determine whether a detected SSB satisfies the QCL, and determine whether the measurement result of the neighboring cell can be obtained based on a measurement result of the first SSB and a measurement result of the second SSB. For example, the measurement result of the first SSB and the measurement result of the second SSB are used as samples of a same measurement for processing, to obtain the measurement result of the neighboring cell.

The obtaining a measurement result of the neighboring cell based on a measurement result of a first synchronization signal block SSB and a measurement result of a second SSB may refer to determining, based on the QCL configuration parameter, the first SSB and the second SSB that satisfy the QCL relationship, and performing processing, such as combining and averaging, or substituting, on the measurement result of the first SSB and the measurement result of the second SSB to obtain the measurement result of the neighboring cell. The measurement result obtained in the step 202 may be referred to as an SS-RSRP measurement result of the neighboring cell.

The QCL relationship corresponding to the QCL configuration parameter may be a QCL relationship pre-defined for the QCL configuration parameter. For example, a protocol, the network device, or the terminal has pre-defined the QCL relationship for the QCL configuration parameter.

In this embodiment of this disclosure, through the foregoing steps, the measurement result of the neighboring cell may be obtained based on measurement results of SSBs satisfying the QCL relationship, thereby improving accuracy of the measurement result. In addition, a problem of neighboring cell signal measurement on SSBs of multiple beams in a 5G unlicensed communications system can be resolved, to ensure accurate measurement to be performed on the neighboring cell with SSBs of multiple beams.

As an optional implementation, the obtaining a measurement result of the neighboring cell based on a measurement result of a first synchronization signal block SSB and a measurement result of a second SSB includes:

using the measurement result of the first SSB and the measurement result of the second SSB as samples of a same measurement for RSRP processing, to obtain the measurement result of the neighboring cell.

The using the measurement result of the first SSB and the measurement result of the second SSB as samples of a same measurement for RSRP processing may refer to determining, based on the QCL configuration parameter, the first SSB and the second SSB that satisfy the QCL relationship, and using the measurement result of the first SSB and the measurement result of the second SSB as samples of a same measurement for RSRP processing, to obtain the measurement result of the neighboring cell.

Optionally, the RSRP processing may include: combining and averaging the measurement result of the first SSB and the measurement result of the second SSB. Certainly, this is not limited. For example, the RSRP processing may refer to substituting a measurement result, for example, substituting the measurement result of the second SSB for the measurement result of the first SSB, or substituting the measurement result of the first SSB for the measurement result of the second SSB.

In this implementation, because the measurement result of the first SSB and the measurement result of the second SSB are used as samples of a same measurement for RSRP processing, accuracy of measurement result of the neighboring cell can be improved.

As an optional implementation, index information of the first SSB and index information of the second SSB satisfy the QCL relationship corresponding to the QCL configuration parameter.

The index information of the first SSB may be an index of the first SSB or partial information of the index of the first SSB, and the index information of the second SSB may be an index of the second SSB or partial information of the index of the second SSB.

That index information of the first SSB and index information of the second SSB satisfy the QCL relationship corresponding to the QCL configuration parameter may mean that a relationship between the index information of the first SSB and the QCL configuration parameter matches a relationship between the index information of the second SSB and the QCL configuration parameter.

In this implementation, because it may be determined by using the index information of the first SSB and the index information of the second SSB that the first SSB and the second SSB satisfy the QCL relationship, the network device needs no signaling to indicate the SSBs satisfying the QCL relationship, thereby reducing complexity and saving transmission overheads.

Optionally, the QCL configuration parameter includes a QCL modulus, and an operation result of the index information of the first SSB with respect to the QCL modulus matches an operation result of the index information of the second SSB with respect to the QCL modulus.

The operation result of the index information of the first SSB with respect to the QCL modulus may be an operation result obtained through a specific operation of the index information of the first SSB with respect to the QCL modulus, for example, a remainder or modulo operation. The operation result of the index information of the second SSB with respect to the QCL modulus may be an operation result obtained through a specific operation of the index information of the second SSB with respect to the QCL modulus.

That the operation results match may mean that the operation results are equal or similar.

As an optional implementation, an operation result of k mod q matches an operation result of j mod q, or an operation result of (k×n/2) mod q matches an operation result of (j×n/2) mod q, where k is the index information of the first SSB, j is the index information of the second SSB, q is the QCL modulus, mod is a remainder function, and n is the number of physical downlink control channels (PDCCH) of a preset type in a unit time-domain resource or the number of cell discovery reference signal (DRS) units in a unit time-domain resource.

It should be noted that in a case that the first SSB is multiple SSBs, k is index information of any SSB of the multiple SSBs, and in a case that the second SSB is multiple SSBs, j is index information of any SSB of these multiple SSBs.

The unit time-domain resource may be a slot. Certainly, this is not limited. For example, the unit time-domain resource may be a sub-frame, or the like. The PDCCH of a preset type may be a type 0 PDCCH defined in a protocol, or certainly, may be a PDCCH of another type.

Further, that the operation result of (k×n/2) mod q matches the operation result of (j×n/2) mod q may mean that an operation result of $\lfloor k \times n/2 \rfloor$ mod q matches an operation result of $\lfloor j \times n/2 \rfloor$ mod q, for example: $\lfloor k \times n/2 \rfloor$ mod q=$\lfloor j \times n/2 \rfloor$ mod q, where $\lfloor \ \rfloor$ may indicate rounding down.

Further, the QCL configuration parameter may further include the number of PDCCHs of the preset type in the unit time-domain resource, or the number of DRS units in the unit time-domain resource.

In this way, all parameters for determining the QCL relationship may be configured in the QCL configuration parameter, so as to avoid configuring the number of PDCCHs of the preset type in the unit time-domain resource or the number of DRS units in the unit time-domain resource through another message, to save transmission resources.

As an optional implementation, in a case that the serving cell and the neighboring cell are time synchronized and the terminal has obtained a to-be-measured SSB list, the index information of the first SSB and the index information of the second SSB are determined through time synchronization.

The serving cell and the neighboring cell are time synchronized, and the network device may configure the to-be-measured SSB list for the terminal. For example, the network may configure the SMTC, the QCL configuration parameter, time synchronization between the serving cell and the neighboring cell, and the to-be-measured SSB list for the terminal through a same configuration message.

It should be noted that in this embodiment of this disclosure, time synchronization between the serving cell and the neighboring cell may be indicated by timing of the serving cell. In other words, in this implementation, the index information of the first SSB and the index information of the second SSB may be determined based on the timing of the serving cell. Specifically, whether the terminal can determine the index information of the first SSB and the index information of the second SSB based on the timing of the serving cell may be configured by the network device. When time synchronization between the serving cell and the neighboring cell is configured by the network device, it means that the network device has configured that an SSB index may be obtained based on the timing of the serving cell.

The to-be-measured SSB list may include indexes of SSBs that need to be measured by the terminal, that is, the to-be-measured SSB list may also be referred to as a to-be-measured SSB index list. In addition, because the serving cell and the neighboring cell are time synchronized, timings of the SSBs, with a same index, of the serving cell and the neighboring cell are synchronized, so that the terminal may determine the time locations of the SSBs in the SSB list based on time locations of the SSBs of the serving cell, that is, determine indexes of the SSBs at the time locations in the neighboring cell. For example, in a case that the to-be-measured SSB list includes an SSB index i, a time location of the SSB index i in the serving cell is location i, so that an index of an SSB at location i in the neighboring cell is determined as i.

In addition, in this implementation, indexes of SSBs in the SSB lists may be determined before measurement is performed on the SSB, so as to determine SSBs satisfying a QCL relationship, and specifically, the SSBs satisfying the QCL relationship may be grouped into an SSB set.

The following describes this implementation by using one embodiment.

If the network device has configured an index of an SSB to be obtainable based on the timing of the serving cell, and the network device has configured the to-be-measured SSB list, for each SSB index i required to be measured, an SSB set I including all SSBs that have a QCL relationship with the SSB index i can be obtained based on a QCL configuration parameter (the set I includes the SSB index i), where any SSB index i' in the set satisfies a specific condition, for example, i' mod q=i mod q, or $\lfloor i' \times n/2 \rfloor$ mod q=$\lfloor i \times n/2 \rfloor$ mod q. The terminal may obtain time locations of the SSBs in the SSB set I based on the timing of the serving cell, and monitor whether SSBs have been transmitted at these time locations in each period. If it is determined that the SSBs have been transmitted, the terminal performs measurement. Such measured RSRP values with the QCL relationship may be all used as measurement samples of the SSB index i for processing, for example, combining and averaging.

As an optional implementation, in a case that the serving cell and the neighboring cell are time synchronized and the terminal has obtained no to-be-measured SSB list, the index information of the first SSB and the index information of the second SSB are determined based on locations of the first SSB and the second SSB, where the locations are obtained through measurement.

In this implementation, locations of the first SSB and the second SSB may be obtained through measurement in a case that no to-be-measured SSB list has been obtained. Because the serving cell and the neighboring cell are time synchronized, the index information of the first SSB and the index information of the second SSB can be determined.

The following describes this implementation by using one embodiment.

If the network device has configured that an index of an SSB can be obtained based on the timing of the serving cell, and the network device configures no to-be-measured SSB list, the terminal measures all SSBs within an SMTC period.

For any two SSBs detected by the terminal, the terminal can obtain indexes j1 and j2 of the two SSBs based on the timing of the serving cell and measured locations of the two SSBs, and determines, based on the configured QCL configuration parameter, whether the indexes satisfy the QCL relationship, that is, whether j1 mod q=j2 mod q or $\lfloor j1 \times n/2 \rfloor$ mod q=$\lfloor j2 \times n/2 \rfloor$ mod q is satisfied. If satisfied, measured RSRP values of the two SSBs can be used as samples of a same measurement for processing.

As an optional implementation, in a case that the serving cell and the neighboring cell are not time synchronized and the terminal has obtained a to-be-measured SSB list, the index information of the first SSB is determined based on a physical broadcast channel (PBCH) demodulation reference signal (DMRS) of the first SSB, and the index information of the second SSB is determined based on a PBCH DMRS of the second SSB.

In this implementation, there is a correspondence between DMRSs and index information of SSBs. For example, one DMRS corresponds to index information of one or more SSBs, and the index information of the first SSB and the index information of the second SSB may be determined based on the DMRSs. For example, the SSB list includes an SSB index i, and index information of an SSB corresponding to the PBCH DMRS of the first SSB also includes i; and therefore, the index of the first SSB is determined as i.

The following describes this implementation by using one embodiment.

If the network device has configured an index of an SSB to be unobtainable based on the timing of the serving cell and the network device has configured a to-be-measured SSB list (or referred to as an SSB index list), UE monitors SSBs within a configured periodic SMTC; and for a detected SSB, an index of the SSB or part of the index of the SSB is detected through a PBCH DMRS. The UE determines, based on a PBCH DMRS ID and a configured QCL condition, whether the detected SSB i' has a QCL relationship with an SSB in the SSB index list, that is, whether i' mod q=i mod q or $\lfloor i' \times n/2 \rfloor$ mod q=$\lfloor i \times n/2 \rfloor$ mod q is satisfied. If the QCL relationship exists, such measured RSRP value is used as one sample of the measured SSB i, and all such sample values are used as samples of a same measurement for subsequent processing, for example, being averaged to obtain an RSRP measurement value of the SSB i. If there is no QCL relationship with any one SSB in the configured to-be-measured SSB index list, the measurement value is discarded.

As an optional implementation, in a case that the serving cell and the neighboring cell are not time synchronized and the terminal has obtained no to-be-measured SSB list, the index information of the first SSB and the index information of the second SSB are determined based on a PBCH DMRS of the first SSB, a PBCH DMRS of the second SSB, and an index difference, where the index difference is a difference determined based on the locations of the first SSB and the second SSB, where the locations are obtained through measurement by the terminal.

The determining the index difference based on the locations of the first SSB and the second SSB, where the locations are obtained through measurement by the terminal, may refer to converting the detected locations of the first SSB and the second SSB into a location difference in a same period, and then determining the index difference between the first SSB and the second SSB based on the location difference. For example, in a case that the first SSB and the second SSB are in different periods, the time locations of the first SSB and the second SSB modulo a period T (or dividing the time locations of the first SSB and the second SSB by the period T to find remainders) are performed to obtain a location difference within the same period. Then, further based on a location difference of SSBs with adjacent indexes (the location difference may be pre-configured or prescribed in the protocol), the number of SSBs between the first SSB and the second SSB is determined, so as to obtain an index difference between the first SSB and the second SSB. For example, the location difference between the first SSB and the second SSB within the same period is E, and the location difference of the SSBs with adjacent indexes is F. In this way, in a case that E is equal to F, the index difference between the first SSB and the second SSB is one index; and in a case that E is equal to 2F, the index difference between the first SSB and the second SSB is two indexes.

In addition, because there is a correspondence between the DMRSs and the index information of the SSBs, candidate index information of the first SSB is determined based on the PBCH DMRS of the first SSB, and candidate index information of a candidate second SSB is determined based on the PBCH DMRS of the second SSB. Then, the two pieces of candidate index formation are searched for index information that has an index difference same as the foregoing index difference, so as to obtain final index information of the first SSB and the final index information of the second SSB.

The following describes this implementation by using one embodiment.

If the network device has configured an index of an SSB to be unobtainable based on the timing of the serving cell and the network device configures no to-be-measured SSB list, the terminal measures all SSBs within an SMTC window of a period T. For any two SSBs obtained through measurement by the terminal, the terminal can obtain a difference $\Delta i$ between indexes of the two SSBs based on transmission time locations t1 and t2 of the two SSBs, may determine their SSB index values based on PBCH DMRS IDs and a configured QCL condition, and then determine their QCL relationship (for example, a difference $\Delta i$ between the indexes of the two SSBs is obtained based on the transmission time locations t1 and t2 of the two SSBs, SSB index values are determined based on the PBCH DMRS IDs, and then the QCL relationship is determined based on the QCL condition), that is, whether j1 mod q=j2 mod q or $\lfloor j1 \times n/2 \rfloor$ mod q=$\lfloor j2 \times n/2 \rfloor$ mod q is satisfied. If satisfied, measured RSRP values of the two SSBs can be used as samples of a same measurement for processing.

Optionally, in the foregoing various implementations, the index information of the first SSB includes an index of the first SSB or partial information of the index of the first SSB; and/or
the index information of the second SSB includes an index of the second SSB or partial information of the index of the second SSB.

In this implementation, the SSBs satisfying the QCL relationship may be determined based on indexes or partial information of the indexes, thereby improving measurement flexibility.

Optionally, in a case that the terminal has obtained the to-be-measured SSB list:
the obtaining a measurement result of the neighboring cell based on a measurement result of a first SSB and a measurement result of a second SSB includes:
obtaining the measurement result of the neighboring cell based on the measurement result of the first SSB and the measurement result of the second SSB under the condition that it is determined based on the QCL configuration parameter that in the to-be-measured SSB list there is a second SSB that satisfies the QCL relationship with the first SSB.

After the receiving a QCL configuration parameter, the method further includes:
discarding the measurement result of the first SSB under the condition that it is determined based on the QCL configuration parameter that in the to-be-measured SSB list there is no second SSB that satisfies the QCL relationship with the first SSB.

In this implementation, in a case that there is no second SSB that satisfies the QCL relationship with the first SSB, the measurement result of the first SSB may be discarded to save storage resources and avoid generating an incorrect measurement result.

As an optional implementation, the receiving a QCL configuration parameter for measuring a neighboring cell includes:
receiving a system information block (SIB) or a radio resource control (RRC) message, where the SIB or the RRC message carries the QCL configuration parameter for measuring a neighboring cell.

The SIB may be SIB2 or SIB4, and the QCL configuration parameter may be the intra-frequency cell reselection information (intra Freq Cell Reselection Info) configuration in the SIB2 or SIB4. For the RRC message, the QCL configuration parameter may be configured in the NR measurement object (MeasObject NR) of the RRC message.

In this implementation, the QCL configuration parameter can be configured for the terminal through a variety of messages to improve measurement flexibility.

As an optional implementation, the QCL configuration parameter is configured per cell, or the QCL configuration parameter is configured per frequency-domain resource.

The frequency-domain resource may be a frequency layer, which means that the QCL configuration parameter may be configured per frequency layer. In this implementation, because the QCL configuration parameter is configured per cell or frequency-domain resource, measurement accuracy can be improved.

For example, the network device adds a QCL configuration parameter during measurement configuration, for example, a QCL modulus q, or the number n of Type 0 PDCCHs (optional) or of DRS units (optional) in one slot. The information is configured per frequency layer or per cell in intra Freq Cell Reselection Info of the SIB2, inter Freq Cell Reselection Info of the SIB4, or MeasObject NR of an RRC message.

The following can be implemented in the foregoing implementations provided in the embodiments of this disclosure:
the network device adds a QCL configuration parameter during neighboring cell measurement configuration, for example, a QCL modulus q, or the number n of Type 0 PDCCHs or DRS units in one slot (optional); and
the terminal may perform measurement based on the SMTC within different periods according to the configuration by the network device, and perform QCL determining on the detected SSB to determine whether the SSB can be used as a sample of a same measurement for processing (for example, combining and averaging, or substituting).

In the embodiments of this disclosure, a QCL configuration parameter for measuring a neighboring cell is received, where the neighboring cell is a cell adjacent to a serving cell of the terminal; and a measurement result of the neighboring cell is obtained based on a measurement result of a first synchronization signal block SSB and a measurement result of a second SSB, where the first SSB and the second SSB satisfy a QCL relationship corresponding to the QCL configuration parameter. In this way, the measurement result of the neighboring cell is obtained through the SSBs satisfying the QCL relationship, thereby improving accuracy of the measurement result.

Figure 3:
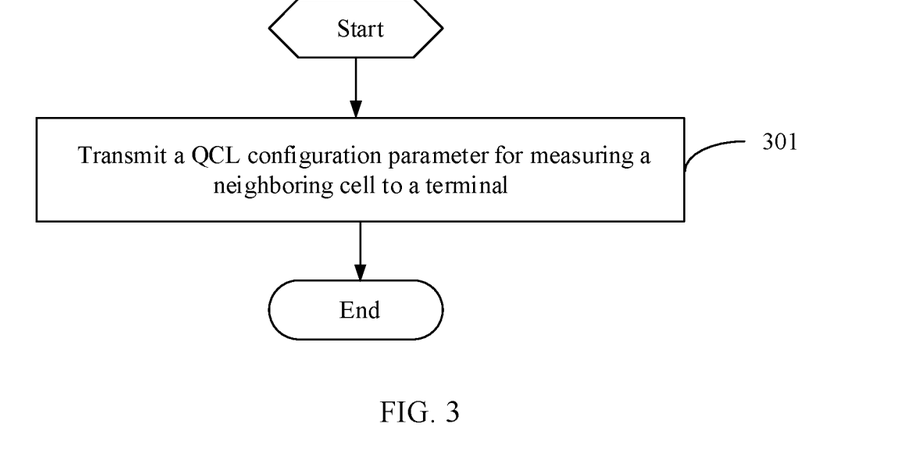
FIG. 3 is a flowchart of a parameter configuration method according to an embodiment of this disclosure.

FIG. 3 is a flowchart of a parameter configuration method according to an embodiment of this disclosure. The method is applied to a network device, and includes the following steps, as shown in FIG. 3.

Step 301. Transmit a QCL configuration parameter for measuring a neighboring cell to a terminal, where the neighboring cell is a cell adjacent to a serving cell of the terminal.

Optionally, the transmitting a quasi-co-location QCL configuration parameter for measuring a neighboring cell to a terminal includes:

transmitting a SIB or an RRC message to the terminal, where the SIB or the RRC message carries the QCL configuration parameter for measuring a neighboring cell.

Optionally, the QCL configuration parameter is configured per cell, or the QCL configuration parameter is configured per frequency-domain resource.

It should be noted that for specific implementations of this embodiment as an implementation of the network device corresponding to the embodiment shown in FIG. 2, reference may be made to the related descriptions about the embodiment shown in FIG. 2. To avoid repetition, this embodiment is not described again, and the same beneficial effects can also be achieved.

Figure 4:
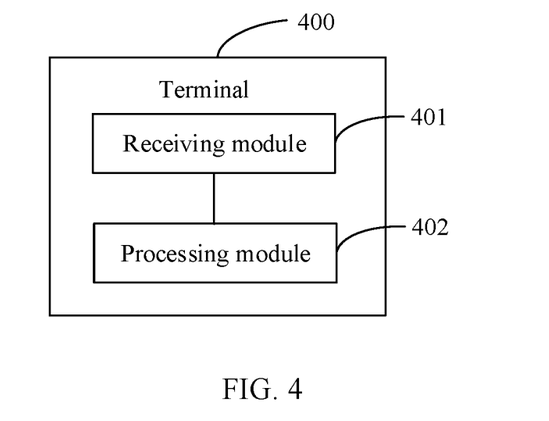
FIG. 4 is a structural diagram of a terminal according to an embodiment of this disclosure.

FIG. 4 is a structural diagram of a terminal according to an embodiment of this disclosure. As shown in FIG. 4, the terminal 400 includes:

a receiving module 401, configured to receive a QCL configuration parameter for measuring a neighboring cell, where the neighboring cell is a cell adjacent to a serving cell of the terminal; and a processing module 402, configured to obtain a measurement result of the neighboring cell based on a measurement result of a first SSB and a measurement result of a second SSB, where the first SSB and the second SSB satisfy a QCL relationship corresponding to the QCL configuration parameter.

Optionally, index information of the first SSB and index information of the second SSB satisfy the QCL relationship corresponding to the QCL configuration parameter.

Optionally, the QCL configuration parameter includes a QCL modulus, and an operation result of the index information of the first SSB with respect to the QCL modulus matches an operation result of the index information of the second SSB with respect to the QCL modulus.

Optionally, an operation result of k mod q matches an operation result of j mod q, or an operation result of (k×n/2) mod q matches an operation result of (j×n/2) mod q.

Optionally, k is the index information of the first SSB, j is the index information of the second SSB, q is the QCL modulus, mod is a remainder function, and n is the number of physical downlink control channels PDCCHs of a preset type in a unit time-domain resource or the number of cell discovery reference signal DRS units in a unit time-domain resource.

Optionally, the QCL configuration parameter further includes the number of PDCCHs of the preset type in the unit time-domain resource or the number of DRS units in the unit time-domain resource.

Optionally, in a case that the serving cell and the neighboring cell are time synchronized and the terminal has obtained a to-be-measured SSB list, the index information of the first SSB and the index information of the second SSB are determined through time synchronization; or in a case that the serving cell and the neighboring cell are time synchronized and the terminal has obtained no to-be-measured SSB list, the index information of the first SSB and the index information of the second SSB are determined based on locations of the first SSB and the second SSB, where the locations are obtained through measurement; or in a case that the serving cell and the neighboring cell are not time synchronized and the terminal has obtained a to-be-measured SSB list, the index information of the first SSB is determined based on a physical broadcast channel PBCH demodulation reference signal DMRS of the first SSB, and the index information of the second SSB is determined based on a PBCH DMRS of the second SSB; or in a case that the serving cell and the neighboring cell are not time synchronized and the terminal has obtained no to-be-measured SSB list, the index information of the first SSB and the index information of the second SSB are determined based on a PBCH DMRS of the first SSB, a PBCH DMRS of the second SSB, and an index difference, where the index difference is an index difference that is determined based on locations of the first SSB and the second SSB, where the locations are obtained through measurement by the terminal.

Optionally, the index information of the first SSB includes an index of the first SSB or partial information of the index of the first SSB; and/or the index information of the second SSB includes an index of the second SSB or partial information of the index of the second SSB.

Optionally, in a case that the terminal has obtained the to-be-measured SSB list:

the processing module 402 is configured to obtain the measurement result of the neighboring cell based on the measurement result of the first SSB and the measurement result of the second SSB under the condition that it is determined based on the QCL configuration parameter that in the to-be-measured SSB list there is a second SSB that satisfies the QCL relationship with the first SSB.

Figure 5:
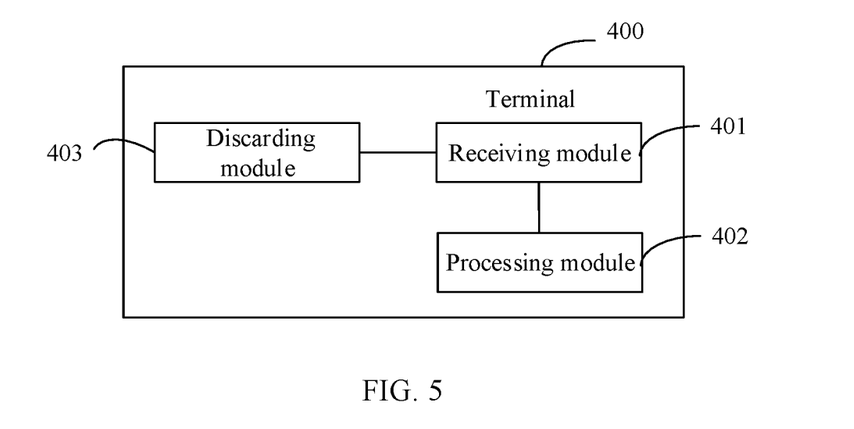
FIG. 5 is a structural diagram of another terminal according to an embodiment of this disclosure.

As shown in FIG. 5, the terminal 400 further includes:

a discarding module 403, configured to discard the measurement result of the first SSB under the condition that it is determined based on the QCL configuration parameter that in the to-be-measured SSB list there is no second SSB that satisfies the QCL relationship with the first SSB.

Optionally, the receiving module 401 is configured to receive a system information block SIB or a radio resource control RRC message, where the SIB or the RRC message carries the QCL configuration parameter for measuring a neighboring cell.

Optionally, the QCL configuration parameter is configured per cell, or the QCL configuration parameter is configured per frequency-domain resource.

Optionally, the processing module 402 is configured to use the measurement result of the first SSB and the measurement result of the second SSB as samples of a same measurement for RSRP processing, to obtain the measurement result of the neighboring cell.

Optionally, the RSRP processing includes:

combining and averaging the measurement result of the first SSB and the measurement result of the second SSB.

The terminal provided in this embodiment of this disclosure can implement the processes implemented by the terminal in the method embodiment in FIG. 2. To avoid repetition, details are not described herein again. The terminal can improve accuracy of measurement results.

Figure 6:
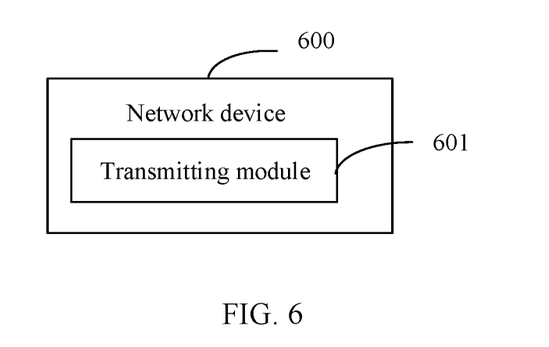
FIG. 6 is a structural diagram of a network device according to an embodiment of this disclosure.

FIG. 6 is a structural diagram of a network device according to an embodiment of this disclosure. As shown in FIG. 6, the network device 600 includes:
  a transmitting module 601, configured to transmit a QCL configuration parameter for measuring a neighboring cell to a terminal, where the neighboring cell is a cell adjacent to a serving cell of the terminal.

Optionally, the transmitting module 601 is configured to transmit a SIB or an RRC message to the terminal, where the SIB or the RRC message carries the QCL configuration parameter for measuring a neighboring cell.

Optionally, the QCL configuration parameter is configured per cell, or the QCL configuration parameter is configured per frequency-domain resource.

The network device provided in this embodiment of this disclosure can implement the processes implemented by the network device in the method embodiment in FIG. 3. To avoid repetition, details are not described herein again. The network device can improve accuracy of measurement results.

Figure 7:
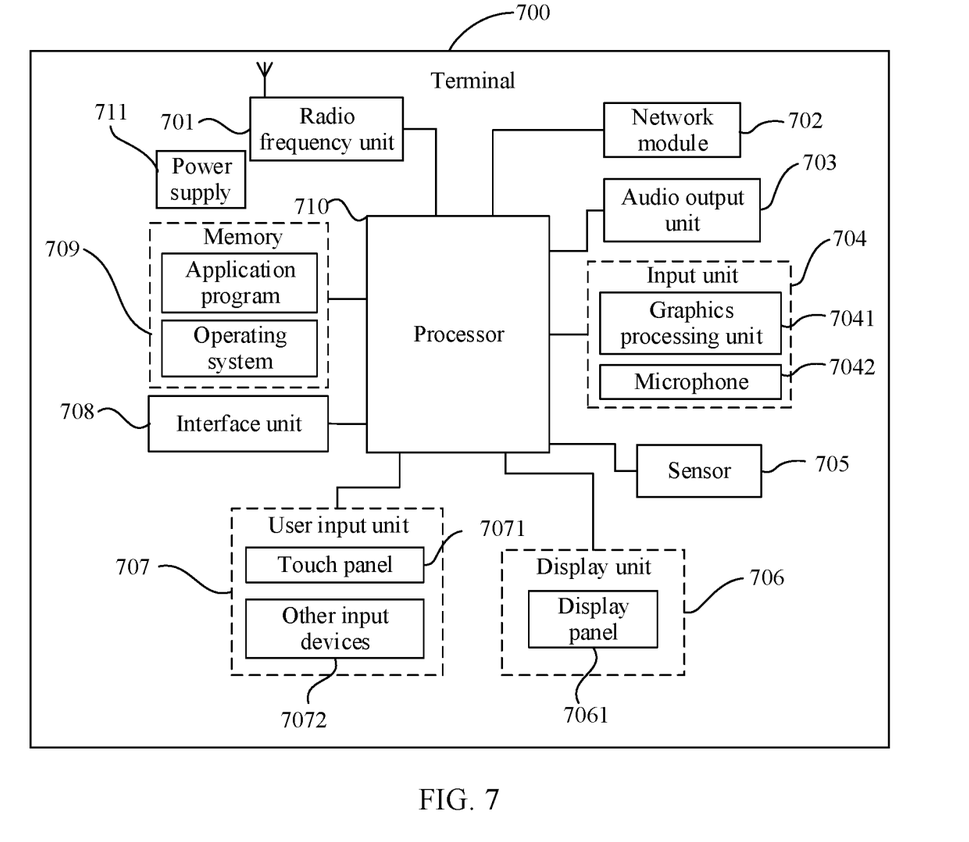
FIG. 7 is a structural diagram of another terminal according to an embodiment of this disclosure.

FIG. 7 is a schematic diagram of a hardware structure of a terminal for implementing the embodiments of this disclosure.

The terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that the terminal is not limited to the terminal structure shown in FIG. 7. The terminal may include more or fewer components than those shown in the figure, or combine some of the components, or arrange the components differently. In this embodiment of this disclosure, the terminal includes but is not limited to a mobile phone, a tablet computer, a laptop computer, a personal digital assistant, an in-vehicle terminal, a robot, a wearable device, a pedometer, and the like.

The radio frequency unit 701 is configured to receive a QCL configuration parameter for measuring a neighboring cell, where the neighboring cell is a cell adjacent to a serving cell of the terminal.

The processor 710 is configured to obtain a measurement result of the neighboring cell based on a measurement result of a first SSB and a measurement result of a second SSB, where the first SSB and the second SSB satisfy a QCL relationship corresponding to the QCL configuration parameter.

Optionally, index information of the first SSB and index information of the second SSB satisfy the QCL relationship corresponding to the QCL configuration parameter.

Optionally, the QCL configuration parameter includes a QCL modulus, and an operation result of the index information of the first SSB with respect to the QCL modulus matches an operation result of the index information of the second SSB with respect to the QCL modulus.

Optionally, an operation result of k mod q matches an operation result of j mod q, or an operation result of (k×n/2) mod q matches an operation result of (j×n/2) mod q, where k is the index information of the first SSB, j is the index information of the second SSB, q is the QCL modulus, mod is a remainder function, and n is the number of physical downlink control channels PDCCHs of a preset type in a unit time-domain resource or the number of cell discovery reference signal DRS units in a unit time-domain resource.

Optionally, the QCL configuration parameter further includes the number of PDCCHs of the preset type in the unit time-domain resource or the number of DRS units in the unit time-domain resource.

Optionally, in a case that the serving cell and the neighboring cell are time synchronized and the terminal has obtained a to-be-measured SSB list, the index information of the first SSB and the index information of the second SSB are determined through time synchronization; or
  in a case that the serving cell and the neighboring cell are time synchronized and the terminal has obtained no to-be-measured SSB list, the index information of the first SSB and the index information of the second SSB are determined based on locations of the first SSB and the second SSB, where the locations are obtained through measurement; or
  in a case that the serving cell and the neighboring cell are not time synchronized and the terminal has obtained a to-be-measured SSB list, the index information of the first SSB is determined based on a physical broadcast channel PBCH demodulation reference signal DMRS of the first SSB, and the index information of the second SSB is determined based on a PBCH DMRS of the second SSB; or
  in a case that the serving cell and the neighboring cell are not time synchronized and the terminal has obtained no to-be-measured SSB list, the index information of the first SSB and the index information of the second SSB are determined based on a PBCH DMRS of the first SSB, a PBCH DMRS of the second SSB, and an index difference, where the index difference is an index difference that is determined based on locations of the first SSB and the second SSB, where the locations are obtained through measurement by the terminal.

Optionally, the index information of the first SSB includes an index of the first SSB or partial information of the index of the first SSB; and/or
  the index information of the second SSB includes an index of the second SSB or partial information of the index of the second SSB.

Optionally, in a case that the terminal has obtained the to-be-measured SSB list:
  the obtaining a measurement result of the neighboring cell based on a measurement result of a first SSB and a measurement result of a second SSB includes:
  obtaining the measurement result of the neighboring cell based on the measurement result of the first SSB and the measurement result of the second SSB under the condition that it is determined based on the QCL configuration parameter that in the to-be-measured SSB list there is a second SSB that satisfies the QCL relationship with the first SSB.

After the receiving a QCL configuration parameter, the processor 710 is further configured to:
  discard the measurement result of the first SSB under the condition that it is determined based on the QCL configuration parameter that in the to-be-measured SSB list there is no second SSB that satisfies the QCL relationship with the first SSB.

Optionally, the receiving a QCL configuration parameter for measuring a neighboring cell includes:
receiving a system information block SIB or a radio resource control RRC message, where the SIB or the RRC message carries the QCL configuration parameter for measuring a neighboring cell.

Optionally, the QCL configuration parameter is configured per cell, or the QCL configuration parameter is configured per frequency-domain resource.

Optionally, the obtaining a measurement result of the neighboring cell based on a measurement result of a first synchronization signal block SSB and a measurement result of a second SSB includes:
using the measurement result of the first SSB and the measurement result of the second SSB as samples of a same measurement for reference signal received power RSRP processing, to obtain the measurement result of the neighboring cell.

Optionally, the RSRP processing includes:
combining and averaging the measurement result of the first SSB and the measurement result of the second SSB.

The terminal may improve accuracy of measurement results.

It should be understood that in this embodiment of this disclosure, the radio frequency unit 701 may be configured to receive and transmit information, or to receive and transmit a signal in a call process, and specifically, after receiving downlink data from a base station, transmit the downlink data to the processor 710 for processing; and also transmit uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and other devices via a wireless communications system.

The terminal provides a user with wireless broadband internet access through the network module 702, for example, helping the user to send or receive an email, to browse a web page, or to access streaming media.

The audio output unit 703 may convert audio data received by the radio frequency unit 701 or the network module 702 or stored in the memory 709 into an audio signal, and output the audio signal as a sound. In addition, the audio output unit 703 may further provide audio output (for example, a call signal reception tone or a message reception tone) that is related to a specific function performed by the terminal 700. The audio output unit 703 includes a speaker, a buzzer, a receiver, and the like.

The input unit 704 is configured to receive an audio signal or a video signal. The input unit 704 may include a graphics processing unit (GPU) 7041 and a microphone 7042. The graphics processing unit 7041 processes image data of a static picture or a video obtained by an image capture apparatus (for example, a camera) in an image capture mode or a video capture mode. A processed image frame may be displayed on the display unit 706. An image frame processed by the graphics processing unit 7041 may be stored in the memory 709 (or another storage medium) or transmitted by the radio frequency unit 701 or the network module 702. The microphone 7042 is capable of receiving sounds and processing such sounds into audio data. The processed audio data may be converted in a telephone call mode into a format that can be transmitted by the radio frequency unit 701 to a mobile communications base station, for outputting.

The terminal 700 further includes at least one sensor 705, for example, an optical sensor, a motion sensor, and other sensors. Specifically, the optical sensor may include an ambient light sensor and a proximity sensor. The ambient light sensor may adjust luminance of the display panel 7061 based on brightness of ambient light, and the proximity sensor may turn off a display panel 7061 and/or backlight when the terminal 700 moves close to an ear. As a motion sensor, an accelerometer sensor may detect a value of an acceleration in various directions (there are usually three axes), may detect a value and a direction of gravity when the terminal is still, and may be configured to recognize a posture of the terminal (for example, landscape/portrait mode switching, a related game, or magnetometer posture calibration), provide a function related to vibration recognition (for example, a pedometer or a keystroke), or the like. The sensor 705 may further include a fingerprint sensor, a pressure sensor, an iris sensor, a molecular sensor, a gyroscope, a barometer, a hygrometer, a thermometer, or an infrared sensor. Details are not described herein.

The display unit 706 is configured to display information input by the user or information provided for the user. The display unit 706 may include the display panel 7061, and the display panel 7061 may be configured in a form of a liquid crystal display (LCD), an organic light-emitting diode (OLED), or the like.

The user input unit 707 may be configured to receive input digit or character information, and generate key signal input that is related to user setting and function control of the terminal. Specifically, the user input unit 707 includes a touch panel 7071 and other input devices 7072. The touch panel 7071 is also referred to as a touchscreen, and may collect a touch operation of the user on or near the touch panel (for example, an operation performed on or near the touch panel 7071 by the user by using any appropriate object or accessory such as a finger or a stylus). The touch panel 7071 may include two parts: a touch detection apparatus and a touch controller. The touch detection apparatus detects a touch location of the user, detects a signal carried by a touch operation, and transmits the signal to the touch controller. The touch controller receives touch information from the touch detection apparatus, converts the touch information into point coordinates, transmits the point coordinates to the processor 710, and receives and executes a command transmitted by the processor 710. In addition, the touch panel 7071 may be implemented in multiple types, for example, as a resistive, capacitive, infrared, or surface acoustic wave touch panel. In addition to the touch panel 7071, the user input unit 707 may further include other input devices 7072. Specifically, the other input devices 7072 may include but are not limited to a physical keyboard, a function key (for example, a volume control key or a power on/off key), a trackball, a mouse, a joystick, and the like. Details are not described herein.

Further, the touch panel 7071 may cover the display panel 7061. When detecting a touch operation on or near the touch panel 7071, the touch panel 7071 transmits the touch operation to the processor 710 to determine a type of a touch event. Then, the processor 710 provides a corresponding visual output on the display panel 7061 based on the type of the touch event. Although in FIG. 7, the touch panel 7071 and the display panel 7061 act as two independent parts to implement input and output functions of the terminal, in some embodiments, the touch panel 7071 and the display panel 7061 may be integrated to implement the input and output functions of the terminal. This is not specifically limited herein.

The interface unit 708 is an interface for connecting an external apparatus to the terminal 700. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 708 may be configured to receive input (for example, data information and electric power) from the external apparatus, and transmit the received input to one or more elements in the terminal 700; or may be configured to transmit data between the terminal 700 and the external apparatus.

The memory 709 may be configured to store a software program and various data. The memory 709 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 709 may include a high-speed random access memory, or may include a non-volatile memory, for example, at least one magnetic disk storage device, a flash memory device, or other volatile solid-state storage devices.

The processor 710 is a control center of the terminal, and is connected to all components of the terminal by using various interfaces and lines. By running or executing a software program and/or a module stored in the memory 709 and invoking data stored in the memory 709, the processor 710 executes various functions of the terminal and processes data, so as to perform overall monitoring on the terminal. The processor 710 may include one or more processing units. Optionally, the processor 710 may integrate an application processor and a modem processor. The application processor mainly processes an operating system, a user interface, an application program, and the like. The modem processor mainly processes wireless communication. It may be understood that the modem processor may alternatively not be integrated in the processor 710.

The terminal 700 may further include the power supply 711 (for example, a battery) supplying power to all components. Optionally, the power supply 711 may be logically connected to the processor 710 through a power management system. In this way, functions such as charge management, discharge management, and power consumption management are implemented by using the power management system.

In addition, the terminal 700 includes some functional modules that are not shown. Details are not described herein.

Optionally, an embodiment of this disclosure further provides a terminal, including a processor 710, a memory 709, and a computer program stored in the memory 709 and capable of running on the processor 710. When the computer program is executed by the processor 710, the processes of the foregoing method for processing a measurement embodiments are implemented, with the same technical effects achieved. To avoid repetition, details are not described herein again.

Figure 8:
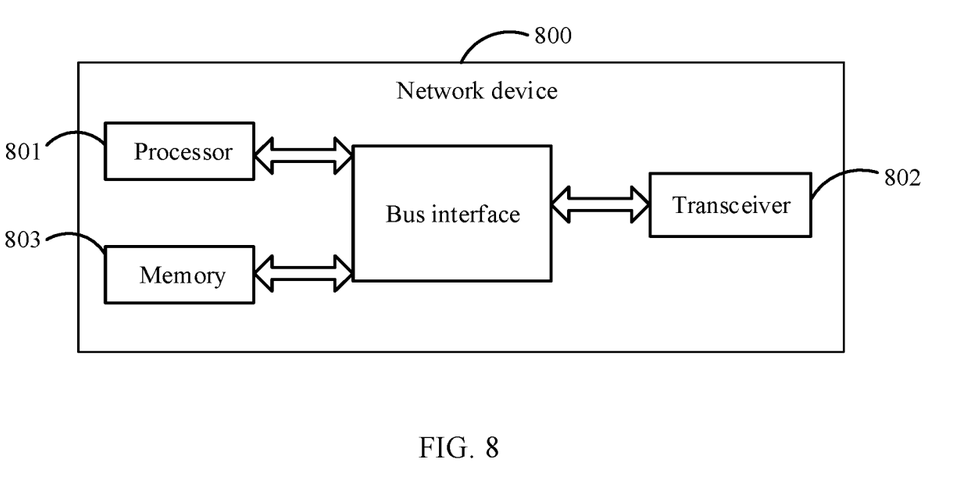
FIG. 8 is a structural diagram of another network device according to an embodiment of this disclosure.

FIG. 8 is a structural diagram of another network device according to an embodiment of this disclosure. As shown in FIG. 8, the network device 800 includes a processor 801, a transceiver 802, a memory 803, and a bus interface, where the transceiver 802 is configured to transmit a QCL configuration parameter for measuring a neighboring cell to a terminal, where the neighboring cell is a cell adjacent to a serving cell of the terminal.

Optionally, the transmitting a QCL configuration parameter for measuring a neighboring cell to a terminal includes:

transmitting a SIB or an RRC message to the terminal, where the SIB or the RRC message carries the QCL configuration parameter for measuring a neighboring cell.

Optionally, the QCL configuration parameter is configured per cell, or the QCL configuration parameter is configured per frequency-domain resource.

The network device may allow the terminal to improve accuracy of measurement result.

The transceiver 802 is configured to receive and transmit data under control of the processor 801. The transceiver 802 includes at least two antenna ports.

In FIG. 8, a bus architecture may include any quantity of interconnected buses and bridges, and specifically connect together various circuits of one or more processors represented by the processor 801 and a memory represented by the memory 803. The bus architecture may further interconnect various other circuits such as a peripheral device, a voltage regulator, and a power management circuit. These are all well known in the art, and therefore are not further described in this specification. The bus interface provides interfaces. The transceiver 802 may be a plurality of components, including a transmitter and a receiver, and provides units for communicating with a variety of other apparatuses on a transmission medium. For different user equipment, the user interface 804 may also be an interface capable of externally or internally connecting a required device, and the connected device includes but is not limited to a keypad, a display, a speaker, a microphone, a joystick, and the like.

The processor 801 is responsible for management of the bus architecture and general processing, and the memory 803 may store data used by the processor 801 when the processor 801 performs an operation.

Optionally, an embodiment of this disclosure further provides a network device, including a processor 801, a memory 803, and a computer program stored in the memory 803 and capable of running on the processor 801. When the computer program is executed by the processor 801, the processes of the foregoing parameter configuration method embodiment are implemented, with the same technical effects achieved. To avoid repetition, details are not described herein again.

An embodiment of this disclosure further provides a computer-readable storage medium. The computer-readable storage medium stores a computer program, and when the computer program is executed by a processor, the processes of the method for processing a measurement on a terminal side provided in the embodiments of this disclosure are implemented, or when the computer program is executed by a processor, the processes of the parameter configuration method on a network-side device provided in the embodiments of this disclosure are implemented, with the same technical effects achieved. To avoid repetition, details are not described herein again. For example, the computer-readable storage medium is a read-only memory (ROM), a random access memory (RAM), a magnetic disk, an optical disc, or the like.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, however, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A method for processing a measurement, performed by a terminal and comprising:
    receiving a quasi co-location (QCL) configuration parameter for measuring a neighboring cell, wherein the neighboring cell is a cell adjacent to a serving cell of the terminal; and
    obtaining a measurement result of the neighboring cell based on a measurement result of a first synchronization signal block (SSB) and a measurement result of a second SSB, wherein the first SSB and the second SSB satisfy a QCL relationship corresponding to the QCL configuration parameter;
    wherein index information of the first SSB and index information of the second SSB satisfy the QCL relationship corresponding to the QCL configuration parameter;
    wherein the QCL configuration parameter comprises a QCL modulus, and an operation result of the index information of the first SSB with respect to the QCL modulus matches an operation result of the index information of the second SSB with respect to the QCL modulus;
    wherein an operation result of k mod q matches an operation result of i mod q, or an operation result of (k×n/2) mod q matches an operation result of (j×n/2) mod q, wherein
    k is the index information of the first SSB, j is the index information of the second SSB, q is the QCL modulus, mod is a remainder function, and n is the number of physical downlink control channels (PDCCHs) of a preset type in a unit time-domain resource or the number of cell discovery reference signal (DRS) units in a unit time-domain resource.

2. The method according to claim 1, wherein the QCL configuration parameter further comprises the number of PDCCHs of the preset type in the unit time-domain resource or the number of DRS units in the unit time-domain resource.

3. The method according to claim 1, wherein in a case that the serving cell and the neighboring cell are time synchronized and the terminal has obtained a to-be-measured SSB list, the index information of the first SSB and the index information of the second SSB are determined through time synchronization; or
    in a case that the serving cell and the neighboring cell are time synchronized and the terminal has obtained no to-be-measured SSB list, the index information of the first SSB and the index information of the second SSB are determined based on locations of the first SSB and the second SSB, where the locations are obtained through measurement; or
    in a case that the serving cell and the neighboring cell are not time synchronized and the terminal has obtained a to-be-measured SSB list, the index information of the first SSB is determined based on a physical broadcast channel (PBCH) demodulation reference signal (DMRS) of the first SSB, and the index information of the second SSB is determined based on a PBCH DMRS of the second SSB; or
    in a case that the serving cell and the neighboring cell are not time synchronized and the terminal has obtained no to-be-measured SSB list, the index information of the first SSB and the index information of the second SSB are determined based on a PBCH DMRS of the first SSB, a PBCH DMRS of the second SSB, and an index difference, wherein the index difference is an index difference that is determined based on locations of the first SSB and the second SSB, wherein the locations are obtained through measurement by the terminal.

4. The method according to claim 3, wherein the index information of the first SSB comprises an index of the first SSB or partial information of the index of the first SSB; and/or
    the index information of the second SSB comprises an index of the second SSB or partial information of the index of the second SSB.

5. The method according to claim 3, wherein in a case that the terminal has obtained the to-be-measured SSB list,
    the obtaining a measurement result of the neighboring cell based on a measurement result of a first SSB and a measurement result of a second SSB comprises:
    obtaining the measurement result of the neighboring cell based on the measurement result of the first SSB and the measurement result of the second SSB under the condition that it is determined based on the QCL configuration parameter that in the to-be-measured SSB list there is a second SSB that satisfies the QCL relationship with the first SSB; and
    after the receiving a QCL configuration parameter, the method further comprises:
    discarding the measurement result of the first SSB under the condition that it is determined based on the QCL configuration parameter that in the to-be-measured SSB list there is no second SSB that satisfies the QCL relationship with the first SSB.

6. The method according to claim 1, wherein the receiving a QCL configuration parameter for measuring a neighboring cell comprises:
    receiving a system information block (SIB) or a radio resource control (RRC) message, wherein the SIB or the RRC message carries the QCL configuration parameter for measuring a neighboring cell.

7. The method according to claim 1, wherein the QCL configuration parameter is configured per cell, or the QCL configuration parameter is configured per frequency-domain resource.

8. The method according to claim 1, wherein the obtaining a measurement result of the neighboring cell based on a measurement result of a first SSB and a measurement result of a second SSB comprises:
using the measurement result of the first SSB and the measurement result of the second SSB as samples of a same measurement for reference signal received power (RSRP) processing, to obtain the measurement result of the neighboring cell.

9. The method according to claim 8, wherein the RSRP processing comprises:
combining and averaging the measurement result of the first SSB and the measurement result of the second SSB.

10. A terminal, comprising a memory, a processor, and a program stored in the memory and capable of running on the processor, wherein the program is executed by the processor to implement:
receiving a quasi co-location (QCL) configuration parameter for measuring a neighboring cell, wherein the neighboring cell is a cell adjacent to a serving cell of the terminal; and
obtaining a measurement result of the neighboring cell based on a measurement result of a first synchronization signal block (SSB) and a measurement result of a second SSB, wherein the first SSB and the second SSB satisfy a QCL relationship corresponding to the QCL configuration parameter;
wherein index information of the first SSB and index information of the second SSB satisfy the QCL relationship corresponding to the QCL configuration parameter;
wherein the QCL configuration parameter comprises a QCL modulus, and an operation result of the index information of the first SSB with respect to the QCL modulus matches an operation result of the index information of the second SSB with respect to the QCL modulus;
wherein an operation result of k mod q matches an operation result of i mod q, or an operation result of (k×n/2) mod q matches an operation result of (j×n/2) mod q, wherein
k is the index information of the first SSB, j is the index information of the second SSB, q is the QCL modulus, mod is a remainder function, and n is the number of physical downlink control channels (PDCCHs) of a preset type in a unit time-domain resource or the number of cell discovery reference signal (DRS) units in a unit time-domain resource.

11. The terminal according to claim 10, wherein the program is further executed by the processor to implement:
receiving a system information block SIB or a radio resource control RRC message, wherein the SIB or the RRC message carries the QCL configuration parameter for measuring a neighboring cell.

12. The terminal according to claim 10, wherein the QCL configuration parameter is configured per cell, or the QCL configuration parameter is configured per frequency-domain resource.

13. The terminal according to claim 10, wherein the program is further executed by the processor to implement:
using the measurement result of the first SSB and the measurement result of the second SSB as samples of a same measurement for reference signal received power RSRP processing, to obtain the measurement result of the neighboring cell.

14. The terminal according to claim 10, wherein the QCL configuration parameter further comprises the number of PDCCHs of the preset type in the unit time-domain resource or the number of DRS units in the unit time-domain resource.

15. The terminal according to claim 10, wherein in a case that the serving cell and the neighboring cell are time synchronized and the terminal has obtained a to-be-measured SSB list, the index information of the first SSB and the index information of the second SSB are determined through time synchronization; or
in a case that the serving cell and the neighboring cell are time synchronized and the terminal has obtained no to-be-measured SSB list, the index information of the first SSB and the index information of the second SSB are determined based on locations of the first SSB and the second SSB, where the locations are obtained through measurement; or
in a case that the serving cell and the neighboring cell are not time synchronized and the terminal has obtained a to-be-measured SSB list, the index information of the first SSB is determined based on a physical broadcast channel (PBCH) demodulation reference signal (DMRS) of the first SSB, and the index information of the second SSB is determined based on a PBCH DMRS of the second SSB; or
in a case that the serving cell and the neighboring cell are not time synchronized and the terminal has obtained no to-be-measured SSB list, the index information of the first SSB and the index information of the second SSB are determined based on a PBCH DMRS of the first SSB, a PBCH DMRS of the second SSB, and an index difference, wherein the index difference is an index difference that is determined based on locations of the first SSB and the second SSB, wherein the locations are obtained through measurement by the terminal.

16. The terminal according to claim 15, wherein the index information of the first SSB comprises an index of the first SSB or partial information of the index of the first SSB; and/or
the index information of the second SSB comprises an index of the second SSB or partial information of the index of the second SSB.

17. The terminal according to claim 15, wherein in a case that the terminal has obtained the to-be-measured SSB list,
the obtaining a measurement result of the neighboring cell based on a measurement result of a first SSB and a measurement result of a second SSB comprises:
obtaining the measurement result of the neighboring cell based on the measurement result of the first SSB and the measurement result of the second SSB under the condition that it is determined based on the QCL configuration parameter that in the to-be-measured SSB list there is a second SSB that satisfies the QCL relationship with the first SSB; and
after the receiving a QCL configuration parameter, the method further comprises:
discarding the measurement result of the first SSB under the condition that it is determined based on the QCL configuration parameter that in the to-be-measured SSB list there is no second SSB that satisfies the QCL relationship with the first SSB.

18. The terminal according to claim 13, wherein the RSRP processing comprises:

combining and averaging the measurement result of the first SSB and the measurement result of the second SSB.

19. A network device, comprising a memory, a processor, and a program stored in the memory and capable of running on the processor, wherein the program is executed by the processor to implement:

transmitting a QCL configuration parameter for measuring a neighboring cell to a terminal, wherein the neighboring cell is a cell adjacent to a serving cell of the terminal;

wherein a first synchronization signal block (SSB) and a second SSB satisfy a QCL relationship corresponding to the QCL configuration parameter, and a measurement result of the first SSB and a measurement result of the second SSB are used by the terminal to obtaining a measurement result of the neighboring cell;

wherein index information of the first SSB and index information of the second SSB satisfy the QCL relationship corresponding to the QCL configuration parameter;

wherein the QCL configuration parameter comprises a QCL modulus, and an operation result of the index information of the first SSB with respect to the QCL modulus matches an operation result of the index information of the second SSB with respect to the QCL modulus;

wherein an operation result of k mod q matches an operation result of i mod q, or an operation result of (k×n/2) mod q matches an operation result of (j×n/2) mod q, wherein k is the index information of the first SSB, j is the index information of the second SSB, q is the QCL modulus, mod is a remainder function, and n is the number of physical downlink control channels (PDCCHs) of a preset type in a unit time-domain resource or the number of cell discovery reference signal (DRS) units in a unit time-domain resource.

20. The network device according to claim 19, wherein the QCL configuration parameter is configured per cell, or the QCL configuration parameter is configured per frequency-domain resource.

\* \* \* \* \*